US012032719B2

(12) United States Patent
Song et al.

(10) Patent No.: US 12,032,719 B2
(45) Date of Patent: Jul. 9, 2024

(54) ELECTRONIC DEVICE AND METHOD FOR CONTROLLING THEREOF

(71) Applicant: Samsung Electronics Co., Ltd., Suwon-si (KR)

(72) Inventors: Juyong Song, Suwon-si (KR); Ilgu Kang, Suwon-si (KR); Chiyoun Park, Suwon-si (KR); Dongjae Lim, Suwon-si (KR); Hyunjoo Jung, Suwon-si (KR); Sunghyun Choi, Suwon-si (KR); Jungwook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 338 days.

(21) Appl. No.: 17/516,036

(22) Filed: Nov. 1, 2021

(65) Prior Publication Data

US 2022/0188452 A1 Jun. 16, 2022

Related U.S. Application Data

(63) Continuation of application No. PCT/KR2021/000995, filed on Jan. 26, 2021.

(30) Foreign Application Priority Data

Dec. 10, 2020 (KR) .......................... 10-2020-0172751

(51) Int. Cl.
*G06F 21/62* (2013.01)
*G06F 16/55* (2019.01)
(Continued)

(52) U.S. Cl.
CPC .......... *G06F 21/6245* (2013.01); *G06F 16/55* (2019.01); *G06F 16/5846* (2019.01);
(Continued)

(58) Field of Classification Search
CPC ...... G06F 21/6245; G06F 21/10; G06F 16/55; G06F 16/5846; G06F 16/587; G06N 3/08
See application file for complete search history.

(56) References Cited

U.S. PATENT DOCUMENTS 8,159,519 B2 4/2012 Kurtz et al.
8,509,499 B2 8/2013 Ioffe et al.
(Continued)

FOREIGN PATENT DOCUMENTS

KR 10-2020-0062499 A 6/2020
WO 2013/137534 A1 9/2013

OTHER PUBLICATIONS

Park, Design and Implementation of Personal Information Identification and Masking System Based on Image Recognition, Oct. 31, 2017.

(Continued)

*Primary Examiner* — Philip J Chea
*Assistant Examiner* — Sangseok Park
(74) *Attorney, Agent, or Firm* — Jefferson IP Law, LLP

(57) ABSTRACT

An electronic device and a method for controlling thereof is provided. The electronic device includes a memory including a neural network model, a display, a communicator including circuitry, and a processor configured to identify, based on a user command to transmit a first image to an external device being input, whether private information of a user is included in the first image by inputting the first image in the neural network model, based on identifying that private information of the user is included in the first image, display a first user interface (UI) asking whether to process at least one private information based on the private information included in the first image, and based on a user
(Continued)

command input through the first UI, process the first image and control the communicator to transmit the processed to the external device.

12 Claims, 8 Drawing Sheets

(51) Int. Cl.
  *G06F 16/583* (2019.01)
  *G06F 16/587* (2019.01)
  *G06F 21/10* (2013.01)
  *G06N 3/08* (2023.01)

(52) U.S. Cl.
  CPC ............ *G06F 16/587* (2019.01); *G06F 21/10* (2013.01); *G06N 3/08* (2013.01)

(56) References Cited

U.S. PATENT DOCUMENTS

| | | | |
|---|---|---|---|
| 9,298,931 B2 | 3/2016 | Ur et al. | |
| 9,672,332 B2 | 6/2017 | Nurmi | |
| 9,911,002 B2 | 3/2018 | Shim et al. | |
| 10,572,681 B1 | 2/2020 | Murphy et al. | |
| 11,055,642 B1* | 7/2021 | Mossoba | G06Q 10/0631 |
| 11,055,674 B1* | 7/2021 | Hart | G06Q 20/0425 |
| 11,526,710 B1* | 12/2022 | Salo | G06V 30/40 |
| 11,544,407 B1* | 1/2023 | Sjöstrand | G06F 3/0486 |
| 2011/0202968 A1* | 8/2011 | Nurmi | G06F 21/10 |
| | | | 726/1 |
| 2013/0305383 A1 | 11/2013 | Garralda et al. | |
| 2016/0034704 A1* | 2/2016 | Shim | H04N 23/80 |
| | | | 726/26 |
| 2017/0061258 A1 | 3/2017 | Chen et al. | |
| 2021/0256966 A1* | 8/2021 | Chatterjee | G06N 3/04 |
| 2021/0297629 A1* | 9/2021 | Lemes da Silva | G06F 18/214 |
| 2022/0092331 A1* | 3/2022 | Stoppa | G06F 18/21 |
| 2023/0025450 A1* | 1/2023 | De La Comble | G06N 3/082 |

OTHER PUBLICATIONS

Yu et al., iPrivacy: Image Privacy Protection by Identifying Sensitive Objects via Deep Multi-Task Learning, May 2017.
Liu et al., Special issue on deep learning for document analysis and recognition Aug. 20, 2018.
International Search Report dated Sep. 10, 2021, issued in International Patent Application No. PCT/KR2021/000995.

* cited by examiner

ELECTRONIC DEVICE AND METHOD FOR CONTROLLING THEREOF

CROSS-REFERENCE TO RELATED APPLICATION(S)

This application is a continuation application, claiming priority under § 365(c), of an International application number PCT/KR2021/000995, filed on Jan. 26, 2021, which is based on and claims priority of a Korean patent application number 10-2020-0172751, filed on Dec. 10, 2020, in the Korean Intellectual Property Office, the disclosure of which is incorporated by reference herein in its entirety.

BACKGROUND

1. Field

The disclosure relates to an electronic device and a method for controlling thereof. More particularly, the disclosure relates to an electronic device configured to use an artificial intelligence model to identify private information included in an image and a method for controlling thereof.

2. Description of Related Art

With the development of communication technology, users are uploading various images to a various devices such as a social networking service (SNS) account and a cloud server through a terminal device. However, if private information of a user is included in an image which is uploaded to various devices, there is a problem of a possibility of private information of the user being easily exposed to the outside.

Meanwhile, research and development on artificial intelligence systems which realize knowledge of a human level are underway. An artificial intelligence system refers to a system performing learning and inference based on a neural network model unlike a rule based system of the related art, and is utilized in various areas such as speech recognition, image recognition, and future prediction.

In particular, an artificial intelligence system which solves problems provided through a deep neural network based on deep learning is recently being developed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device which identifies private information included in an image based on artificial intelligence technology and a method for controlling thereof.

Additional aspects will be set forth in part in the description which follows and, in part, will be apparent from the description, or may be learned by practice of the presented embodiments.

In accordance with an aspect of the disclosure, an electronic device is provided. The electronic device includes a memory including a neural network model trained to identify private information of a user of the electronic device in which an image is included, a display, a communicator including circuitry, and a processor configured to identify, based on a user command to transmit a first image to an external device being input, whether private information of the user is included in the first image by inputting the first image in the neural network model, control, based on identifying that private information of the user is included in the first image, the display to display a first user interface (UI) asking whether to process at least one private information based on private information included in the first image, and process, based on a user command input through the first UI, the first image and control the communicator to transmit the processed to the external device.

In accordance with another aspect of the disclosure, a method of controlling an electronic device including a neural network model trained to identify private information of a user of the electronic device in which an image is included is provided. The method includes identifying, based on a user command to transmit a first image to an external device being input, whether private information of the user is included in the first image by inputting the first image in the neural network model, displaying, based on identifying that private information of the user is included in the first image, a first user interface (UI) asking whether to process at least one private information based on private information included in the first image, and processing, based on a user command input through the first UI, the first image and transmitting the processed first image to the external device.

Based on the various embodiments of the disclosure as described above, a user may easily identify whether private information is included in an image to be uploaded, and easily upload an image in which only an area including private information is processed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
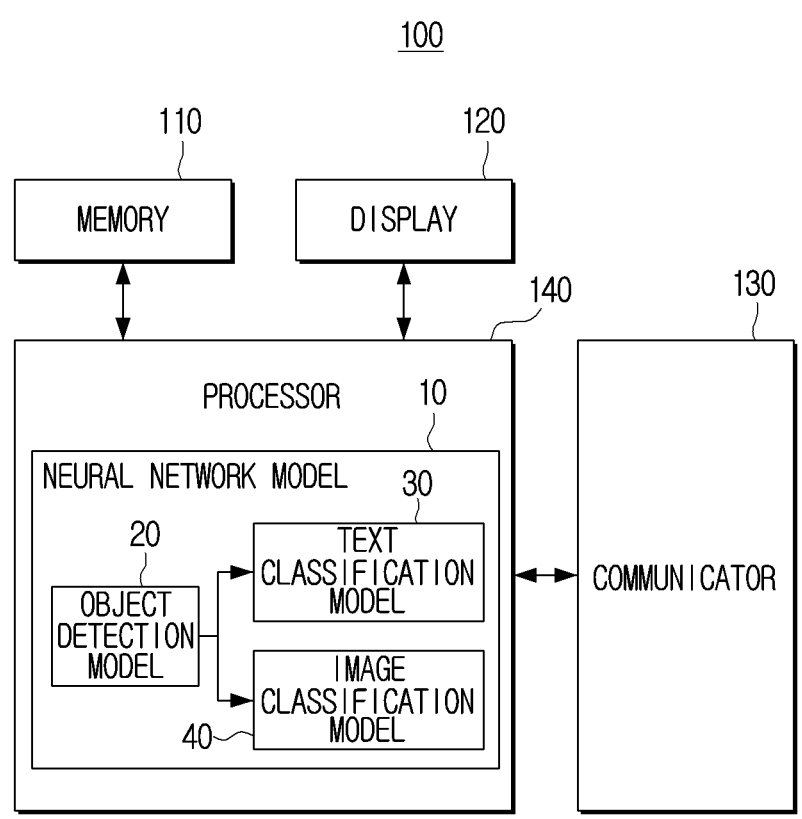
FIG. 1 is a block diagram illustrating in brief a configuration of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The disclosure relates to an electronic device configured to use an artificial intelligence model to detect private information included in an image to be uploaded, and determine whether to process private information included in the image by providing a detection result to a user, and a method for controlling thereof.

In describing the disclosure, private information may be information on an individual and may refer to information which identifies an individual or identifies an individual by easily combining with other information. For example, private information may include text (characters, numbers, etc.) object which may identify an individual such as a name of an individual, a phone number, a card number, a passport number, a vehicle number, an e-mail address, a home address, and the like, and an image object which may identify an individual such as a portrait photograph, a fingerprint photograph, a photograph of portraits of people around an individual, and the like. However, the embodiment is not limited thereto, and private information may include information of various types which may identify an individual.

Further, in describing the disclosure, an image may include a still image (e.g., still images such as a photograph, computer graphic, etc.) and a moving image (e.g., a live-view image, etc.).

Further, in describing the disclosure, the term "user" may refer to a person using an electronic device or a device (e.g., artificial intelligence electronic device) using an electronic device.

The disclosure will be described in detail below with reference to the drawings.

FIG. 1 is a block diagram illustrating in brief a configuration of an electronic device according to an embodiment of the disclosure.

Referring to FIG. 1, an electronic device 100 may include a memory 110, a display 120, a communicator 130, and a processor 140. However, the configuration illustrated in FIG. 1 is an example diagram for realizing the embodiments of the disclosure, and hardware and software configurations appropriate to a level obvious to those of ordinary skill in the art may be additionally included in the electronic device 100.

In describing the disclosure, the electronic device 100 may be realized as a desktop personal computer (PC), a laptop PC, a notebook, a smartphone, a tablet PC, a robot, a wearable device, a camera device, and the like, but is not limited thereto. Further, an external device may not only be realized as a device of a type which is listed in describing the device of the type which can be realized by the electronic device 100, but also be realized as various servers (SNS server which provides and manages SNS service, cloud server, content server which provides and manages content, etc.), medical devices, home appliance products, and the like.

The memory 110 may be configured to store instructions or data associated with at least one other element of the electronic device 100. Further, the memory 110 may be accessed by the processor 140, and reading/writing/modifying/deleting/updating and the like of data may be performed by the processor 140.

In the disclosure, the term memory may include the memory 110, a read only memory (ROM; not shown) within the processor 140, a random access memory (RAM; not shown), or a memory card (not shown) which may be mounted to the electronic device 100 (e.g., micro secure digital (SD) card, memory stick). In addition, the memory 110 may be stored with programs and data for comprising various screens to be displayed in a display area of the display 120.

The memory 110 may include a non-volatile memory capable of maintaining stored information even of power supply is terminated, and a volatile memory which requires continuous power supply to maintain the stored information. For example, the non-volatile memory may be realized as at least one from among a one time programmable ROM (OTPROM), a programmable ROM (PROM), an erasable and programmable ROM (EPROM), an electrically erasable and programmable ROM (EEPROM), a mask ROM, or a flash ROM, and the volatile memory may be realized as at least one from among a dynamic RAM (DRAM), a static RAM (SRAM), or a synchronous dynamic RAM (SDRAM), but are not limited thereto.

The memory 110 may be configured to store a neural network model 10 and data necessary for operating the neural network model 10. The neural network model 10 may refer to an artificial intelligence model trained to identify private information of the user of the electronic device 100 included in an image. The neural network model 10 may be trained to identify private information included in the image based on learning data which includes private information of various types. Meanwhile, the neural network model 10 may be controlled by the processor 140.

The memory 110 may be configured to store weight data used in the calculation of the neural network model 10. That is, the memory 110 may be configured to store a plurality of weight data included in a plurality of layers comprising the neural network model 10. The weight data may include a plurality of weight values included in the weight data.

The neural network model 10 may be configured to detect objects included in an image, and include an object detection model 20 which is an artificial intelligence model trained to classify the detected object as a text or an image. The object detection model 20 may be configured to detect various objects which are included in the image, and may be trained to classify the detected objects as a text (e.g., characters, numbers, etc.) or an image (profile image, etc.).

The neural network model 10 may include a text classification model 30 which is an artificial intelligence model trained to output a first privacy level corresponding to an object classified as a text from among the objects detected from the image and an image classification model 40 which is an artificial intelligence model trained to output a second privacy level corresponding to an object classified as an image from among the objects detected from the image.

Here, the privacy level corresponding to an object may refer to a percentage of an object being information which is to be protected as private information of the user. The privacy level corresponding to the object being high may refer to a high percentage of the object being information which is to be protected as private information.

Figure 2:
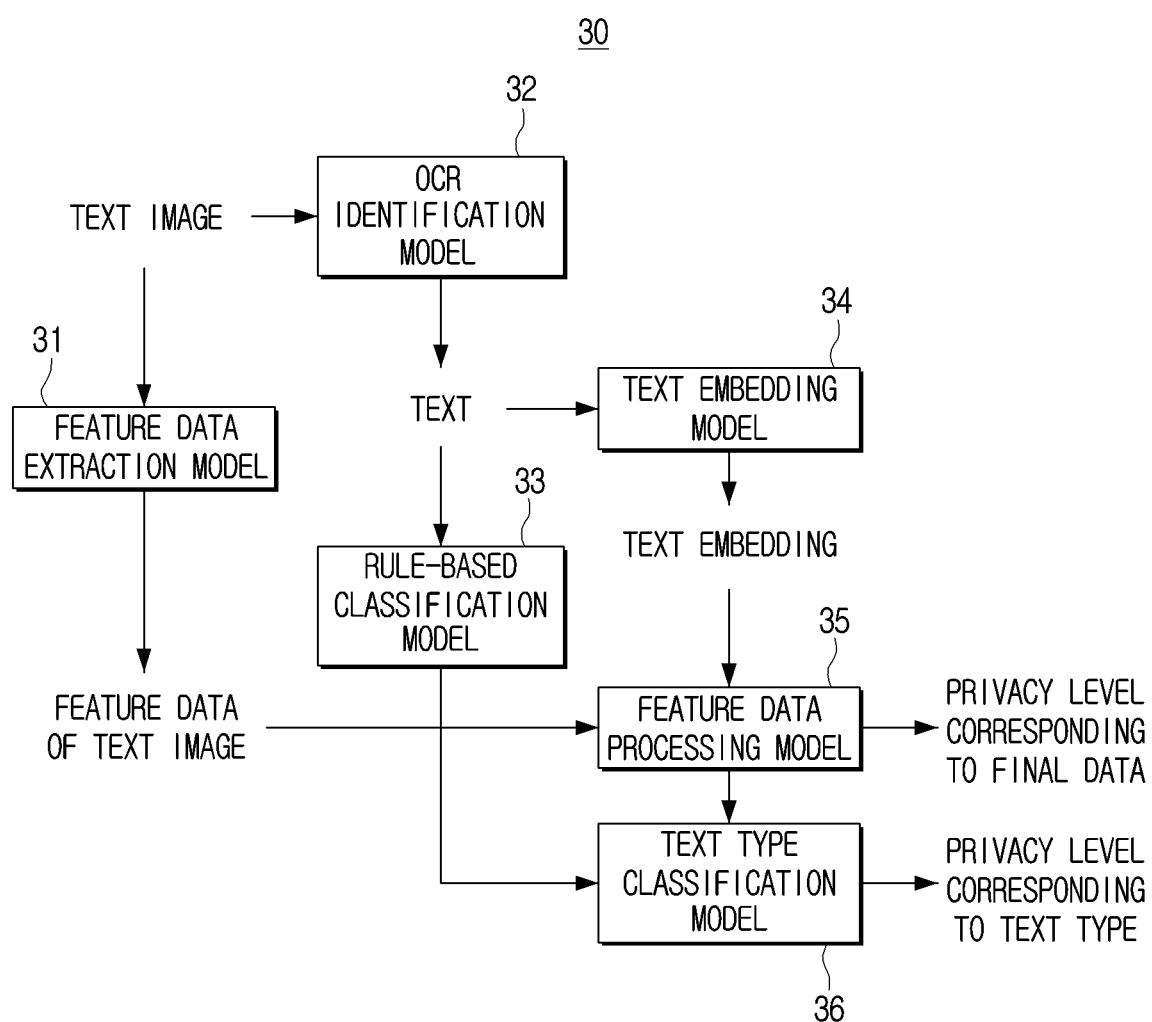
FIG. 2 is a diagram illustrating a configuration and an operation of a text classification model according to an embodiment of the disclosure.

FIG. 2 is a diagram illustrating a configuration and an operation of a text classification model according to an embodiment of the disclosure.

Referring to FIG. 2, a configuration and operation of a text classification model 30 will be described in detail. The text classification model 30 may include a feature data extraction model 31, an optical character recognition (OCR) identification model 32, a rule-based classification model 33, a text embedding model 34, a feature data processing model 35, and a text type classification model 36. The respective models included in the text classification model 30 may be controlled by the processor 140.

The feature data extraction model 31 may be an artificial intelligence model trained to extract feature data of the input image. Based on a first object from among at least one object included in an image being classified as a text by the object detection model 20, the text classification model 30 may extract feature data of a text image by inputting the classified image of the first object, that is the text image, to the feature data extraction model 31.

The OCR identification model 32 may be a model which extracts texts included in the text image by applying an OCR function to the text image. Based on the first object from among the at least one object included in the image being classified as the text by the object detection model 20, the text classification model 30 may extract the text included in the text image by inputting the text image to the OCR identification model 32.

The rule-based classification model 33 may be a model which identifies whether a certain text form is included in the input text. The passport number, the card number, the resident identification number, the e-mail address, and the like may be realized as a text including a certain form. Based on the text extracted through the OCR identification model 32 being input, the rule-based classification model 33 may identify whether the input text includes a certain form, and identify a type of a text which matches to the form included in the text. For example, when the input text is 'aaa@bbb.com,' the rule-based classification model 33 may identify that the input text includes an e-mail address form, and identify that the identified text is a text including an e-mail type.

The text embedding model 34 may refer to a model which extracts embedding data on a text by applying a pre-set embedding algorithm with respect to the text.

The feature data processing model 35 may concatenate the feature data of the text image with the embedded text to output a final feature data, and may refer to an artificial intelligence model trained to output a privacy level corresponding to the output final feature data.

The text type classification model 36 may refer to an artificial intelligence model trained to output a privacy level corresponding to a text type based on the type of the text obtained through the rule-based classification model 33 and the final feature data obtained through the feature data processing model 35. A pre-defined weight may be matched for respective types of text. For example, in case of a text of a type with relatively high importance such as a passport number, a resident identification number, and the like, a high weight may be matched, and in case of a text of a type with relatively low importance such as an e-mail address, a low weight may be matched.

The text type classification model 36 may obtain a calculation value by applying the matched weights for respective types of text. The privacy level corresponding to the text type may be output by using the obtained calculation value and the final feature data. That is, the text classification model 30 may identify the type corresponding to the object classified as the text, and output data (e.g., privacy level corresponding to text type) for calculating a first privacy level by applying a pre-defined weight to the identified type.

The text classification model 30 may calculate the first privacy level corresponding to the object classified as the text by summing the privacy level corresponding to a final data and the privacy level corresponding to the text type. At this time, the text classification model 30 may multiply a certain weight value (e.g., 10) to the privacy level corresponding to the text type, and sum the value of multiplying the weight value with the privacy level corresponding to the final data to calculate the first privacy level.

The image classification model 40 may extract the feature data on the object classified as the image from among the objects included in the image. The image classification model 40 may extract the type and attribute (e.g., feature on whether the corresponding object is an object identified as requiring protection from the user, etc.) of the object through the extracted feature data.

In an embodiment, based on an image (e.g., face of the user, face of a friend or family of the user, a product included with a company logo of the user, or document, etc.) input as requiring protection being input from the user, the image classification model 40 may be trained to identify whether the object classified as the image included in the image is the image input as requiring protection by the user based on the feature data on the input image.

The image classification model 40 may output the second privacy level corresponding to the object classified as the image based on the type and attribute of the extracted object. For example, based on the object being the image input as requiring protection by the user, the image classification model 40 may output the second privacy level exceeding a threshold value. In another example, based on the object being the image (e.g., user profile image, family photograph of the user, a product included with a company logo of the user, etc.) associated with the user stored in the electronic device 100, the image classification model 40 may output the second privacy level exceeding the threshold value.

The neural network model 10 may, based on at least one from among the first privacy level and the second privacy level exceeding the threshold value, identify as private information of the user being included in the first image. In still another embodiment, the threshold values corresponding to the first privacy level and the second privacy level, respectively, may be varied from each other. For example, the neural network model 10 may identify whether the private information of the user is included in the first image based on whether the first privacy level exceeds a first threshold value, and identify whether the private information of the user is included in the first image based on whether the second privacy level exceeds a second threshold value, which is different from the first threshold value. Here, the threshold value may be a value which is pre-set according to experimentation or research, but the embodiment is not limited thereto, and may be changed by the user.

Further, the neural network model 10 may output meta data on at least one private information included in the first image. The meta data on the private information may refer to information showing private information attributes such as a type, a location, a privacy level, and the like. The meta data may be realized in a form of a relational database, a form of a scene graph, and the like, but the embodiment is not limited thereto, and may be realized in various forms.

As illustrated in FIG. 1, respective models 20, 30 and 40 may be included in the neural network model 10, but the embodiment is not limited thereto, and the respective models 20, 30 and 40 may be realized as separate models located outside of the neural network model 10.

The memory 110 may be configured to recognize a user speech, and may include a dialogue system which is an artificial intelligence model trained to output information corresponding to the recognized user speech. The dialogue system may include an automatic speech recognition (ASR) model which recognizes the user speech and outputs a text corresponding thereto, and a natural language understanding (NLU) model which understands a meaning of a text. For example, the dialogue system may recognize and understand the user speech in which a command for sharing or uploading an image to a specific external device is included.

The display 120 may be configured to display various information according to the control of the processor 140. For example, the display 120 may be configured to display a first user interface (UI) asking whether to process at least one private information based on the private information included in the first image. In another example, the display 120 may be configured to display, based on a user command for selecting an image identified as including private information being input, a second UI requesting a user authentication. In still another example, the display 120 may be configured to display a third UI asking whether private information not identified by the neural network model is included in the image.

In addition, the display 120 may be configured to display a live-view image photographed through a camera. When private information is detected from among the live-view image, the display 120 may be configured to display a bounding box showing a form of the detected private information from among the live-view image.

The display 120 may be realized through various display technologies such as, for example, and without limitation, a liquid crystal display (LCD), organic light emitting diodes (OLED), an active-matrix organic light-emitting diode (AM-OLED), a liquid crystal on silicon (LcoS), a digital light processing (DLP), or the like.

In addition, the display 120 may be coupled to at least one from among a front surface area, a side surface area, and a rear surface area of the electronic device 100 in the form of a flexible display. In addition, the display 120 may be realized as a touch screen which includes a touch sensor.

The communicator 130 may include circuitry, and may perform communication with a server of a plurality of groups, an external device of a plurality of groups, or with a different device. The communicator 130 may include various communication modules to perform communication with the external device.

In an example, the communicator 130 may include a wireless communication module, and may include a cellular communication module which uses at least one from among, for example, and without limitation, a long term evolution (LTE), an LTE Advance (LTE-A), a code division multiple access (CDMA), a wideband CDMA (WCDMA), a universal mobile telecommunications system (UMTS), a Wireless Broadband (WiBro), a 5th generation (5G), a global system for mobile communications (GSM), or the like. In another example, the wireless communication module may include at least one from among, for example, wireless fidelity (Wi-Fi), Bluetooth, Bluetooth low energy (BLE), and Zigbee.

The communicator 130 may be configured to transmit the first image or the first image in which the private information area is processed to the external device. In still another example, the communicator 130 may be configured to transmit the first image and meta data on the private information included in the first image to an external device realized as a SNS server.

The processor 140 may be electrically connected with the memory 110 and may be configured to control the overall operation and function of the electronic device 100. The processor 140 may be configured to load to the neural network model 10 stored in the non-volatile memory and the volatile memory necessary for the neural network model 10 to perform various operations. The loading may refer to an operation of calling the data stored in the non-volatile memory to the volatile memory and storing for the processor 140 to access the data.

The volatile memory may be realized, as illustrated in FIG. 1, in the form included in the processor 140 as an element of the processor 140, but this is merely one embodiment, and the volatile memory may be realized as elements separate from the processor 140.

When a user command to transmit the first image to the external device is input, the processor 140 may be configured to identify whether the private information of the user is included in the first image by inputting the first image to the neural network model 10.

The transmitting the first image to the external device may refer to uploading or sharing the first image with the external device. Further, the user command to transmit the first image to the external device may include, based on the first image being obtained, a command to automatically upload the first image to the external device (e.g., cloud server). At this time, the obtaining the first image may include the processor 140 receiving the image from a different device through the communicator 130 or obtaining the first image through the camera.

Specifically, the processor 140 may be configured to detect (or, recognize) the object included in the first image through the object detection model 20 of the neural network model 10. The processor 140 may be configured to classify the recognized object to an image or a text through the text classification model 30 and the image classification model 40 of the neural network model 10, and obtain the first privacy level corresponding to the object classified as the text or the second privacy level corresponding to the object classified as the image. The processor 140 may be configured to identify, based on at least one from among the first privacy level and the second privacy level exceeding the threshold value, that the private information of the user is included in the first image and obtain meta data on the private information included in the first image through the neural network model 10. Because the description on the neural network model 10 and the various models 20, 30 and 40 included in the neural network model 10 have been described above, redundant descriptions will be omitted.

Based on identifying that the private information of the user is included in the first image, the processor 140 may be configured to display the first UI asking whether to process at least one private information based on the private information included in the first image. The first UI may include a message for the user that a private information is included in the first image which is to be transmitted to the external device, a message asking whether to transmit to the external device by processing the first image, and the like.

Further, the bounding box for showing an area in which the private information is included in the first image may be included in the first UI. The bounding box may refer to a box of a minimum size capable of including all forms of the objects showing private information. The processor 140 may be configured to control the display 120 to display the bounding box including the form of an object which shows private information from among the first image by using information on the location of the private information included in the first image from among the meta data obtained through the neural network model 10. The first UI will be described in detail with reference to FIGS. 4A and 4B.

According to an embodiment, based on a user command of not processing the private information included in the first image being input through the first UI, the processor 140 may be configured to control the communicator 130 to transmit the first image to the external device.

In another example, based on the user command of processing the private information included in the first image being input through the first UI, the processor 140 may be configured to process (e.g., blurring process, masking process, deleting process, mosaic process, etc.) the area of which the private information is included from among the first image, and control the communicator 130 to transmit the processed first image to the external device.

In still another example, based on a user command of processing only some of the selected private information from among the private information included in the first image being input through the first UI, the processor 140 may be configured to process only the some of the selected private information, and control the communicator 130 to transmit the processed first image to the external device.

Based on identifying that the private information of the user is not included in the first image through the neural network model 10, the processor 140 may be configured to control the communicator 130 to transmit the first image to the external device.

According to another embodiment, based on a second image being obtained through a camera 180, the processor 140 may be configured to identify whether the private information of the user is included in the second image by inputting the second image to the neural network model 10.

Based on the private information of the user being included in the second image, the processor 140 may be configured to control the display 120 so that the second UI demanding user authentication is displayed when the user command of selecting the second image is input. The embodiment associated therewith will be described in detail with reference to FIG. 5.

According to still another embodiment, based on identifying whether the private information of the user is included in the first image through the neural network model 10, the processor 140 may be configured to control the display 120 so that the third UI asking whether private information not identified by the neural network model is included in the first image is displayed. Based on information input from the user through the third UI, the processor 140 may be configured to additionally train the neural network model 10. Specifically, when a specific object from among the first image is selected through the third UI, and information (e.g., selected object type, private information attributes corresponding to the selected object, etc.) on the selected object is input, the processor 140 may be configured to train the neural network model 10 based on information on the selected object and the specific data on the selected object image in the first image.

For example, when a face of a person appearing with the user from among the first image is selected through the third UI, and information that the face of the selected person is the face of a friend of the user is input, the processor 140 may be configured to train the neural network model 10 based on the feature data on a facial image of the selected person included in the first image and the input information. That is, the neural network model 10 may be trained to identify the facial image of the detected person as private information when the facial image of the person selected in the input image is detected.

In still another embodiment, it may be assumed that the external device is a SNS server managing a social networking service (SNS). The processor 140 may be configured control, based on the external device being a SNS server managing a social networking service (SNS), so that an image in which the area including the private information of the user is processed from among the first image, is to be uploaded based on the meta data in a SNS account of the user by controlling the communicator to transmit the first image and the meta data on private information comprised in the first image. The embodiment associated therewith will be described in detail with reference to FIG. 6.

The function associated with the artificial intelligence according to the disclosure may be operated through the processor 140 and the memory 110. The processor 140 may be comprised of one or a plurality of processors. The one or plurality of processors may be a generic-purpose processor such as a central processing unit (CPU), an application processor (AP), or a digital signal processor (DSP), a graphics dedicated processor such as a graphic processing unit (GPU) or a vision processing unit (VPU), or an artificial intelligence dedicated processor such as a neural processing unit (NPU).

The one or plurality of processors 140 may control for the input data to be processed according to a pre-defined operation rule or an artificial intelligence model stored in the memory 110. Alternatively, if the one or plurality of processors is an artificial intelligence dedicated processor, the artificial intelligence dedicated processor may be designed to a hardware structure specializing in the processing of a specific artificial intelligence model.

The pre-defined operation rule or the artificial intelligence model is characterized by being created through learning. The being created through learning referred herein refers to the pre-defined operation rule or artificial intelligence model being created to perform a desired feature (or, purpose) because the basic artificial intelligence module is trained by a learning algorithm using a plurality of learning data. The learning may be carried out in a machine itself in which the artificial intelligence according to the disclosure is performed, or carried out through a separate server and/or system.

Examples of the learning algorithm may include a supervised learning, a unsupervised learning, a semi-supervised learning, or a reinforcement learning, but is not limited to the above-described examples.

The artificial intelligence model may include a plurality of artificial neural networks, and an artificial neural network may be comprised of a plurality of layers. Respective neural network layers may include a plurality of weight values, and may perform neural network processing through processing between the processing results of a previous layer and the plurality of weight values. The plurality of weight values comprised by the plurality of neural network layers may be optimized by the learning result of the artificial intelligence model. For example, the plurality of weight values may be updated for a loss value or a cost value obtained by the artificial intelligence model during the learning process to be reduced or optimized.

The artificial neural network may include a Deep Neural Network (DNN), and examples thereof may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Deep-Q Networks, or the like, but the embodiment is not limited to the above-described examples.

Figure 3:
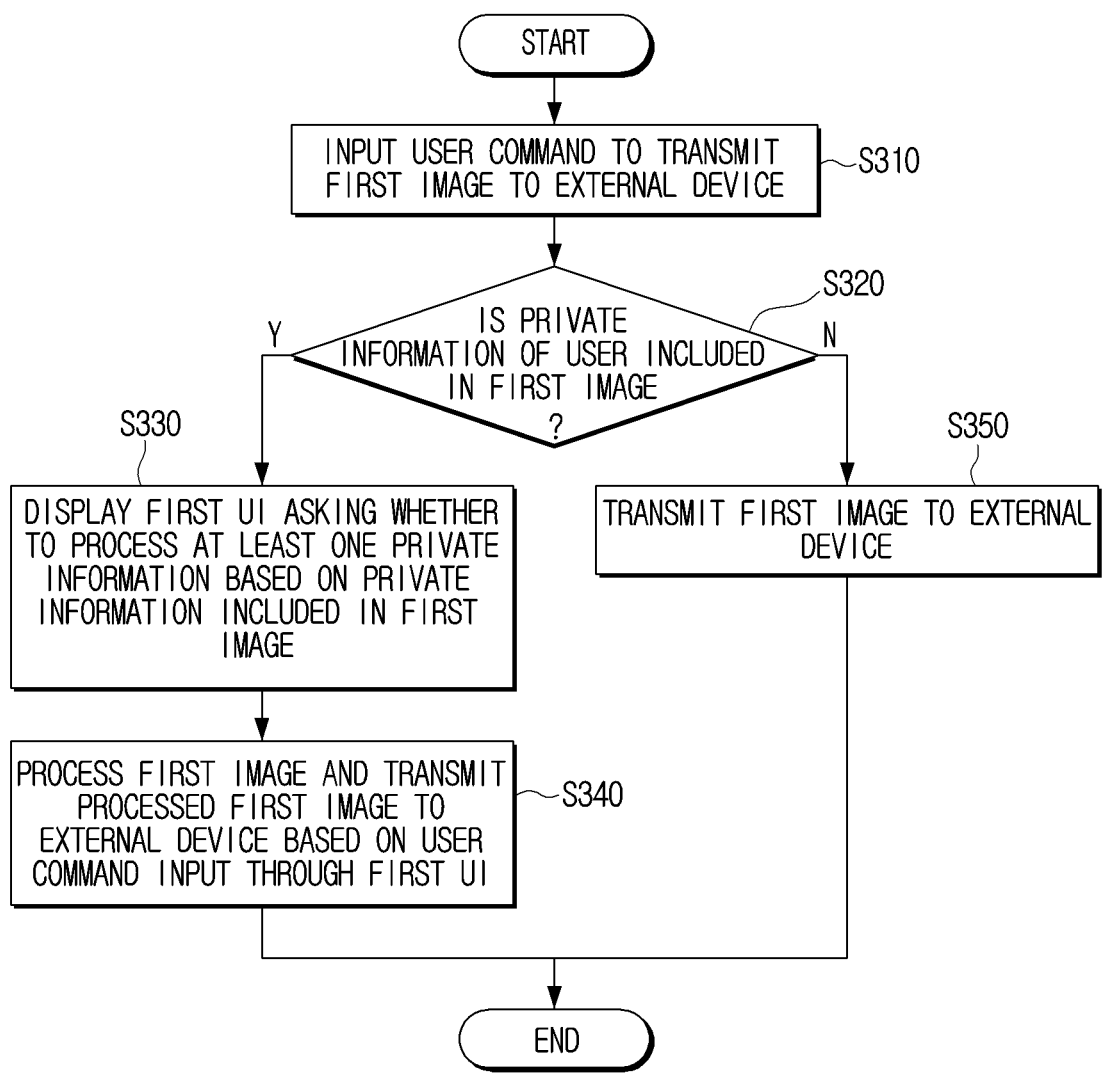
FIG. 3 is a flowchart illustrating a control method of an electronic device according to an embodiment of the disclosure.

FIG. 3 is a flowchart illustrating a control method of an electronic device according to an embodiment of the disclosure.

Referring to FIG. 3, an electronic device 100 may be configured to receive the user command to transmit the first image to the external device, at operation S310. For example, the user command to transmit the first image to the external device being input may include an icon capable of uploading or sharing the first image with a specific external device being selected or a voice command to upload or share the first image with the specific external device being input.

The electronic device 100 may be configured to identify whether the private information of the user is included in the first image, at operation S320. The electronic device 100 may be configured to input the first image to the neural network model and identify whether the private information of the user is included in the first image. Specifically, the electronic device 100 may be configured to recognize the object included in the first image through the neural network model.

The electronic device 100 may be configured to classify the object recognized through the neural network model as an image or a text, and obtain the first privacy level corresponding to the object classified as the text or the second privacy level corresponding to the object classified as the image. Further, the electronic device 100 may be configured to identify whether the private information of the user is included in the first image based on whether at least one from among the first privacy level and the second privacy level exceeds the threshold value.

Based on identifying that the private information is included in the first image, the electronic device 100 may be configured to display the first UI asking whether to process at least one private information based on the private information included in the first image, at operation S330.

For example, the electronic device 100 may be configured to display the first UI included with a message for the user that private information is included in the first image which is to be transmitted to the external device and a message asking whether to transmit to the external device by processing the first image. In still another example, the electronic device 100 may be configured to display the first UI included with the bounding box which shows the area of which the private information is located from among the first image by using information on the location of the private information from among the meta data on the private information.

The electronic device 100 may be configured to process the first image and transmit the processed first image to the external device based on the user command input through the first UI, at operation S340. For example, based on the user command to process private information included in the first image being input through the first UI, the electronic device 100 may be configured to process (blurring process, masking process, deleting process, mosaic process, etc.) the private information in the first image, and transmit the processed first image to the external device. The embodiment associated therewith may be described in detail with reference to FIGS. 4A and 4B.

Based on identifying that the private information of the user is not included in the first image, the electronic device 100 may be configured to transmit the first image to the external device, at operation S350. That is, if the private information of the user is not included in the first image, the electronic device 100 may be configured to upload of share the first image with the external device as is.

Figure 4A:
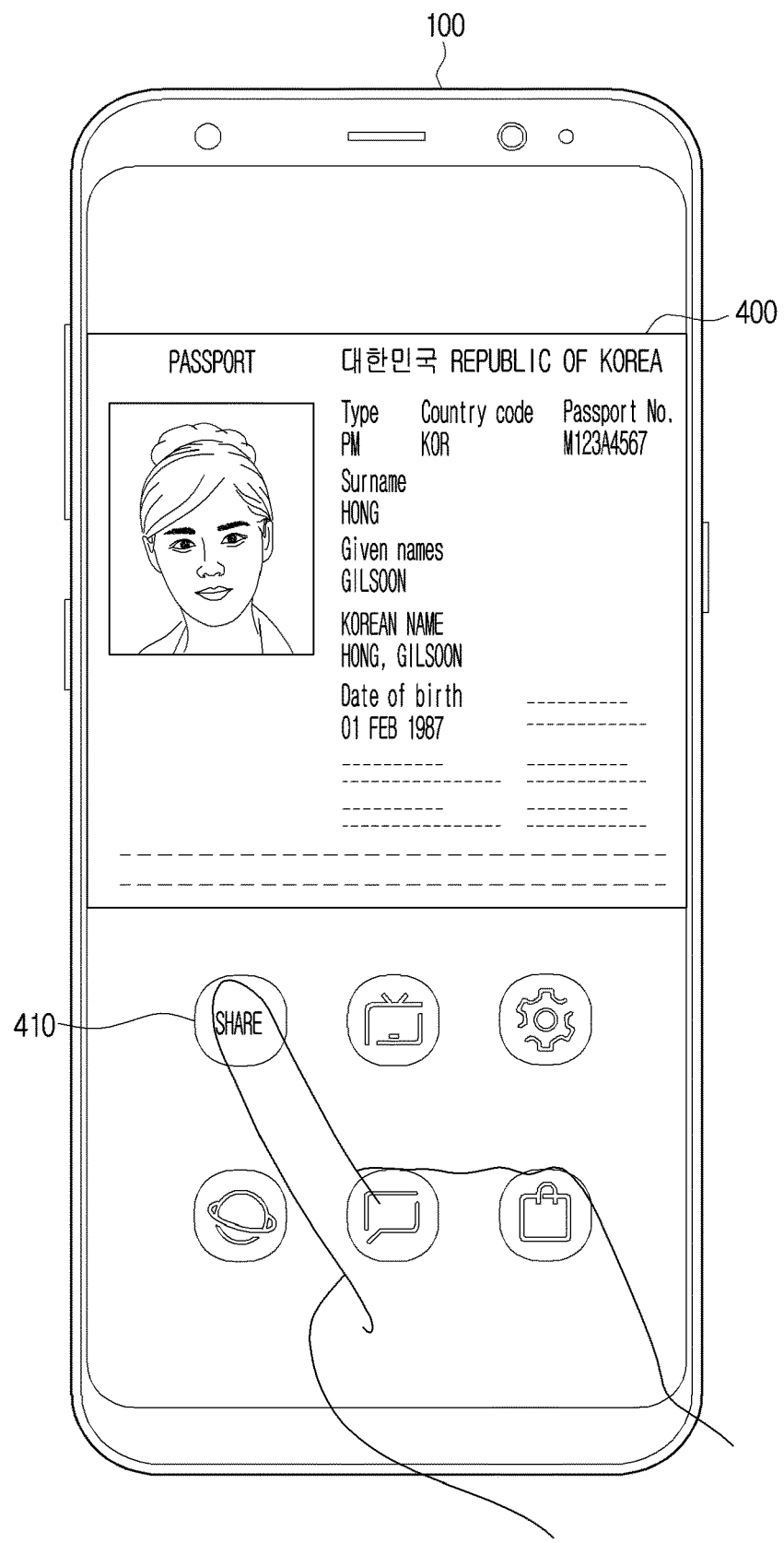
FIG. 4A is a diagram illustrating a process of transmitting an image to an external device by an electronic device according to an embodiment of the disclosure.
Figure 4B:
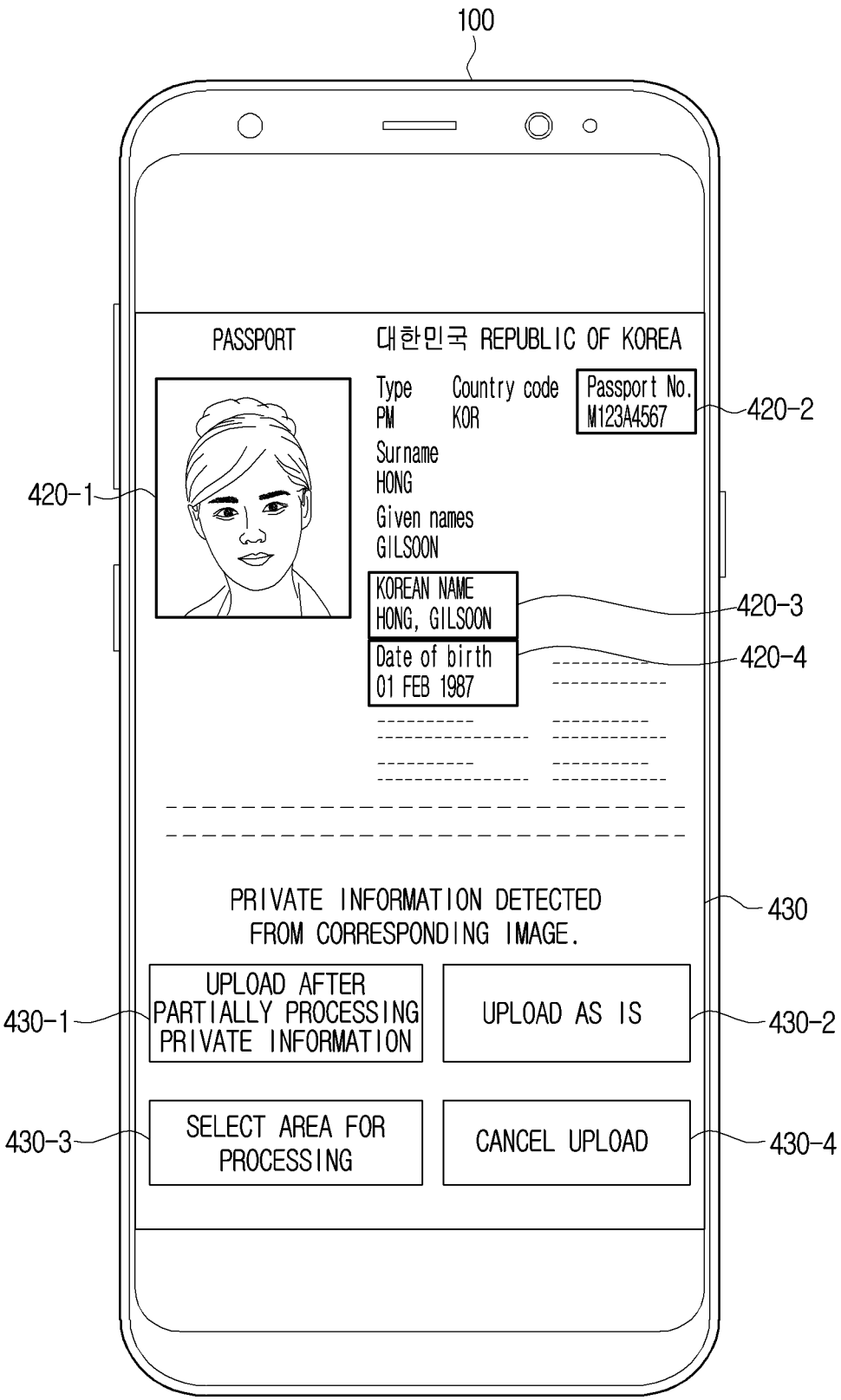
FIG. 4B is a diagram illustrating a process of detecting private information included in an image by an electronic device according to an embodiment of the disclosure.

FIGS. 4A and 4B are diagrams illustrating a process of detecting private information included in an image by an electronic device according to an embodiment, and transmitting to an external device by processing the detected private information. Although, an electronic device is illustrated as being a smartphone in FIGS. 4A and 4B, this is merely one embodiment, and the electronic device may be realized as various devices.

FIG. 4A is a diagram illustrating a process of transmitting an image to an external device by an electronic device according to an embodiment of the disclosure.

Referring to FIG. 4A, an electronic device 100 may be configured to receive the user command to transmit a first image 400, which is a photograph that captured a passport, to the external device. As illustrated in FIG. 4A, the operation of receiving the user command may be realized in an embodiment in which an icon 410 for sharing the first image 400 with the external device is selected. However, the embodiment is not limited thereto, and in another example, the operation of receiving the user command may be realized in an embodiment in which the user command to automatically upload the obtained first image 400 to the external device (e.g., cloud server) is pre-input based on the first image 400 being obtained through the camera.

When the user command to transmit the first image 400 to the external device is input, the electronic device 100 may be configured to identify whether the private information is included in the first image 400. Specifically, the electronic device 100 may be configured to recognize, through the neural network model, a plurality of objects included in the first image 400, and classify the recognized object as an image or a text. Further, the electronic device 100 may be configured to identify, through the neural network model, whether the private information included in the first image 400 based on the privacy level corresponding to the object classified as the image or the text.

FIG. 4B is a diagram illustrating a process of detecting private information included in an image by an electronic device according to an embodiment of the disclosure.

Referring to FIG. 4B, based on identifying that the private information of the user is included in the first image, an electronic device 100 may be configured to display a first UI 430 asking whether to process private information based on the private information included in the first image. The first UI 430 may include a message (e.g., 'private information detected from corresponding image') for the user that the private information is included in the first image which is to be transmitted to the external device.

The first UI 430 may be included with a UI element (e.g., icon, etc.) for selecting a method to transmit the first image to the external device. For example, the first UI 430 may be included with an icon 430-1 for processing an area included with private information from among the first image and transmitting to the external device, an icon 430-2 for transmitting the first image as is to the external device, an icon 430-3 for processing only a selected area from among the first image, and an icon 430-4 for cancelling an operation to transmit the first image to the external device. The electronic device 100 may be configured to perform an operation corresponding to the selected icon from among the plurality of icons 430-1, 430-2, 430-3 and 430-4.

The first UI 430 may be included with the bounding box which shows the area of which the private information is located from among the first image. The electronic device 100 may be configured to obtain meta data included with information on the location of the private data from among the first image through the neural network model. It may be assumed that the neural network model identified the facial image of the user, the name of the user, the date of birth and the passport number of the user as the private information of the user from among the first image. The electronic device 100 may be configured to use the meta data on the private information obtained through the neural network model to display a bounding box 420-1 showing the area in which the facial image of the user is located on the first image. In the same method as above, the electronic device 100 may be configured to display the bounding boxes 420-2, 420-3, and 420-4 showing the name of the user, the date of birth and the passport number of the user on the first image.

In an embodiment, based on one from among the bounding box included in the first image being selected, the electronic device 100 may be configured to display meta data on the private information included in the selected bounding box. For example, based on the bounding box 420-1 from among the plurality of bounding boxes being selected, the electronic device 100 may be configured to display a type of the object (user facial image) included in the bounding box 420-1 or a privacy level corresponding to the object.

Figure 5:
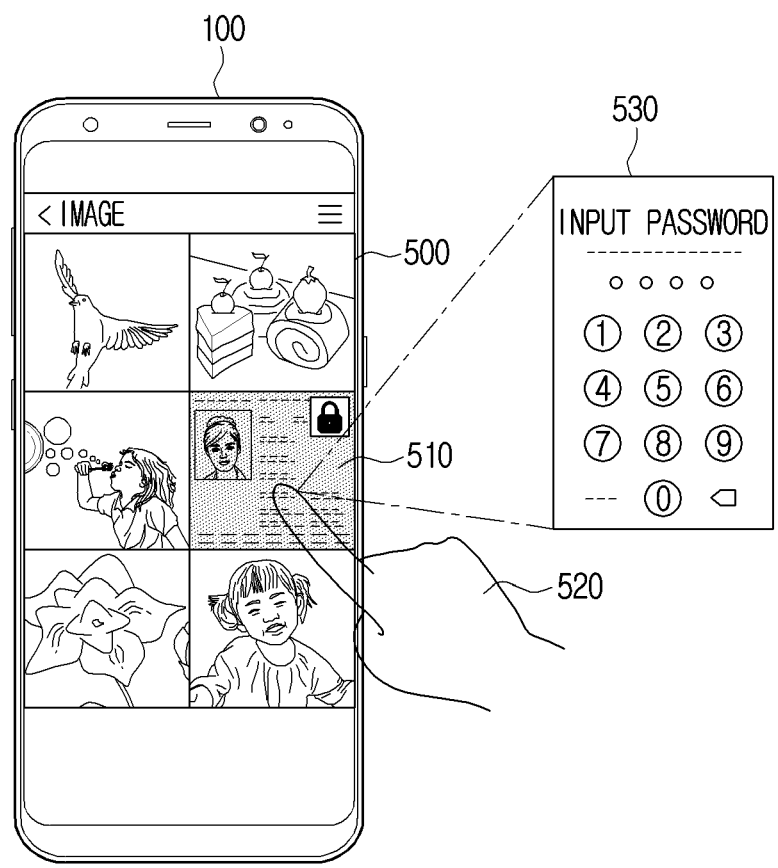
FIG. 5 is a diagram illustrating a method of displaying an image included with private information by an electronic device according to an embodiment of the disclosure.

FIG. 5 is a diagram illustrating a method of displaying an image included with private information by an electronic device according to an embodiment of the disclosure.

Referring to FIG. 5, an electronic device 100 may be configured to obtain an image by capturing the surroundings of the electronic device 100 through the camera, and store the obtained image in the memory. The electronic device 100 may be configured to execute an album application 500 (or, gallery application, etc.) and display the stored image.

The album application 500 may refer to an application for selecting a stored image by the user and performing operations such as sharing, editing, viewing, and the like of the selected image.

Based on the image obtained through the camera being a still image included with the private information of the user such as a passport, an identification card, or the like, there is a danger in that a different user who is not the user of the electronic device 100 may execute the album application and view the still images included with the private information.

The electronic device 100 may be configured to identify, based on a second image 510 being obtained by capturing the surrounding of the electronic device through the camera, whether the private information of the user is included in the second image 510 by inputting the second image 510 in the neural network model. When the private information of the user is included in the second image 510, the electronic device 100 may be configured to display a second UI 530 demanding user authentication based on the user command 520 (e.g., touch input selecting the second image 510) to select the second image 510 being input.

Based on the private information of the user being included in the second image 510, even if the second image 510 is not selected, the electronic device 100 may be configured to not display only the second image 510 in the album application, or display the second image 510 in which the area included with the private information is processed.

Referring to FIG. 5, a second UI 530 may be realized to a UI demanding the input of a pre-registered password to authenticate the user, but is not limited thereto. The second UI 530 may be realized to a UI demanding the input of a pre-registered biometric information (e.g., fingerprint, iris, face, etc.) to authenticate the user.

When the user is authenticated through the second UI 530, the electronic device 100 may be configured to display the second image 510. That is, when the user is authenticated through the second UI 530, the electronic device 100 may be configured to display the second image 510 in which the area included with the private information is not processed.

Figure 6:
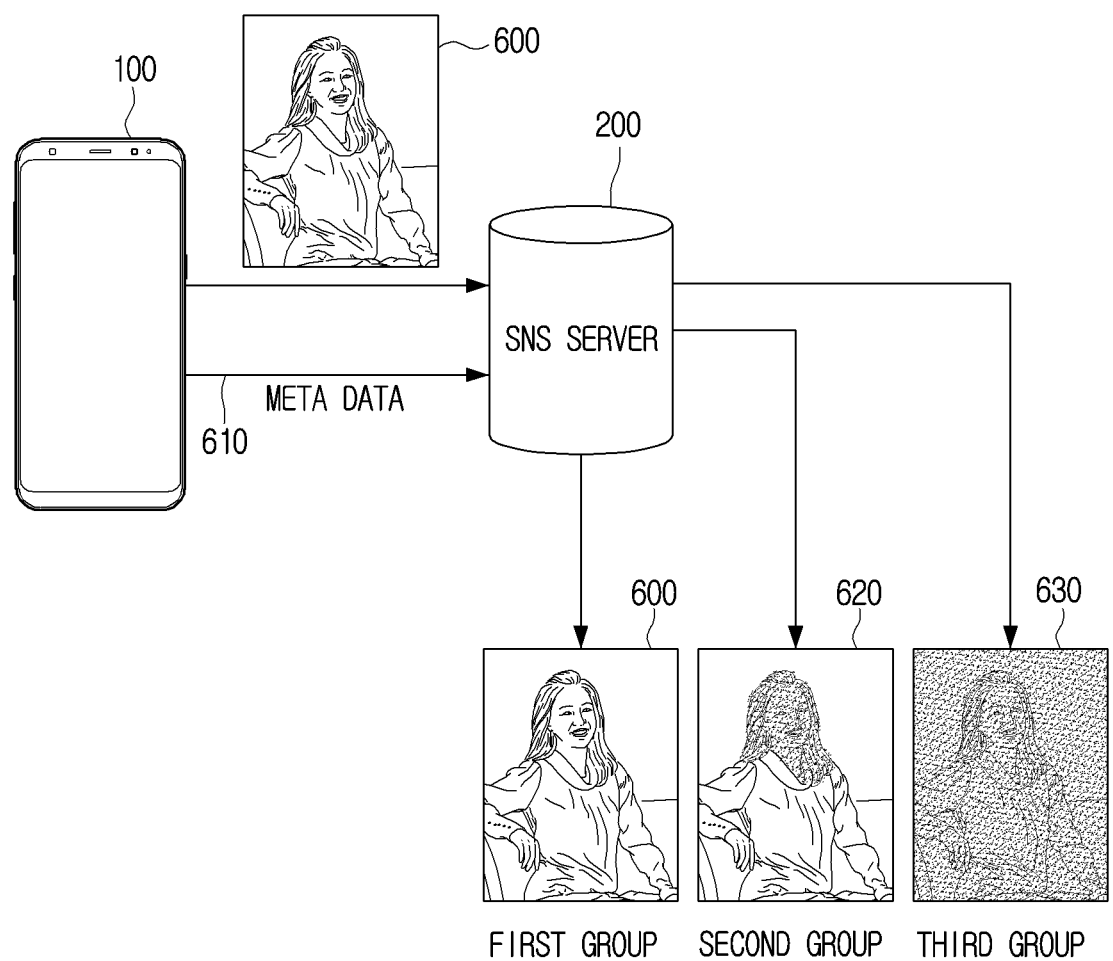
FIG. 6 is a diagram illustrating a process of transmitting an image included with private information to an external device by an electronic device according to an embodiment of the disclosure.

FIG. 6 is a diagram illustrating a process of transmitting an image included with private information to an external device by an electronic device according to an embodiment of the disclosure.

Referring to FIG. 6, it may be assumed that an electronic device 100 is realized as a smartphone, and an external device is realized as an SNS server 200 configured to provide and manage SNS service.

The electronic device 100 may be configured to receive the user command to transmit a first image 600 to the SNS server 200, that is, the user command to upload the first image 600 to the SNS account of the user of the electronic device 100.

Based on the user command being input, the electronic device 100 may be configured to transmit the first image 600 and meta data 610 on the private information included in the first image 600 to the SNS server 200. In an embodiment, based on the first image 600 being obtained through the camera, the electronic device 100 may be configured to input the first image 600 in the neural network model to detect private information included in the first image 600, and obtain meta data on the private information. In another example, based on the user command to transmit the first image to the SNS server 200 being input, the electronic device 100 may be configured to input the first image 600 in the neural network model to detect the private information included in the first image 600, and obtain meta data on the private information.

Referring to FIG. 6, it may be assumed that the user of the electronic device 100 is logged-on with the user account in the SNS application. Based on the user of the electronic device 100 not being logged-on with the user account in the SNS application, the electronic device 100 may be logged-on in the SNS server by transmitting the first image 600 and the meta data with the user account information (e.g., ID, password, etc.) to the SNS server 200.

The SNS server 200 may be configured to control a showing scope of the first image 600 based on a network group connected with the user account. The network group connected with the user account may refer to a group in which the user of the electronic device 100 grouped at least one account forming a relationship in SNS by a certain standard.

For example, the SNS server 200 may show an original image of the first image 600 to an account included in a first group which is connected with the user account.

In another example, the SNS server 200 may show an image in which the area (e.g., a facial portion of the user) included with the private information from among the first image 600 is processed (e.g., blurring process, masking process, etc.) to an account included in a second group which is connected with the user account based on the meta data. For example, the SNS server 200 may be configured to use information on the location (e.g., location of the user face) included with the private information of the user from among the meta data to process the area included with the private information, and then provide the processed image 620 to the user included in the second group. Here, the second group may be a group comprised of accounts which are not closer than the first group.

In another example, the SNS server 200 may show an image 630 in which the whole area is processed from among the first image 600 to an account included in a third group which is connected with the user account. Here, the third group may be a group comprised of accounts which are not closer than the second group or a group comprised of accounts which have not formed a relationship in SNS.

That is, the electronic device 100 may control, by transmitting the first image 600 and the meta data on the private information included in the first image 600 to the SNS server 200, so that an image, in which the area including the private information of the user is processed from among the first image, is to be uploaded based on the meta data in the SNS account of the user.

According to another embodiment, the electronic device 100 may be configured to transmit the first image 600 and the image in which the private information included in the first image 600 is processed to the SNS server 200. The SNS server 200 may be configured to show the original image of the first image 600 according to the showing scope corresponding to the group connected with the user account or show the image in which the private information is processed from among the first image 600. Here, the scope showing the uploaded image may be matched with the respective groups, and the showing scope for the respective groups may be changed variously by the user.

Figure 7:
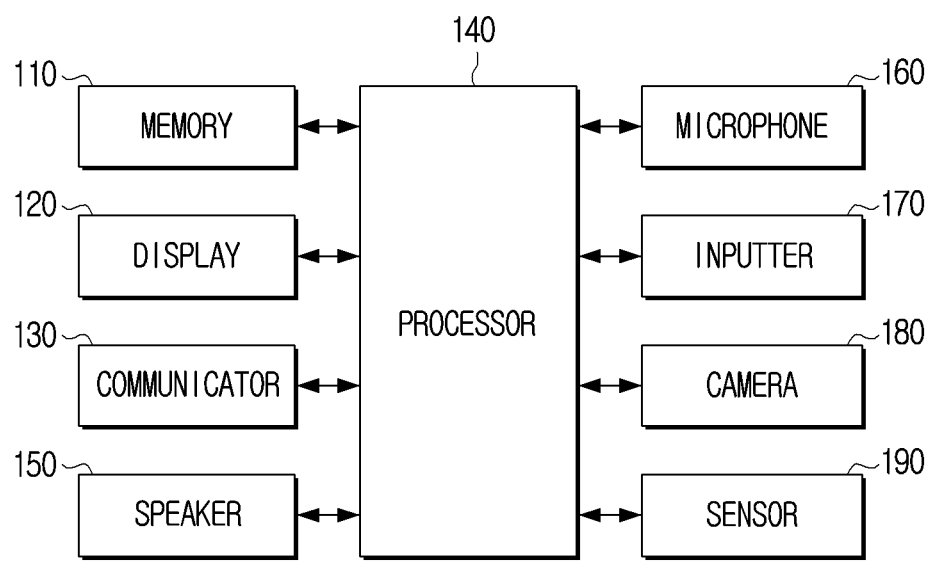
FIG. 7 is a block diagram illustrating in detail a configuration of an electronic device according to an embodiment of the disclosure.

FIG. 7 is a block diagram illustrating in detail a configuration of an electronic device according to an embodiment of the disclosure.

Referring to FIG. 7, an electronic device 100 may include a memory 110, a display 120, a communicator 130, a processor 140, a speaker 150, a microphone 160, an inputter 170, a camera 180, and a sensor 190. Because the memory 110, the display 120, the communicator 130, and the processor 140 have been described in detail with reference to FIG. 1, redundant descriptions will be omitted.

The speaker 150 may be a configuration which not only outputs various audio data to which various processing operations such as decoding, amplifying, and noise filtering have been performed by an audio processor, but also various notification sounds or voice messages.

For example, the speaker 150 may be configured to output a response to the user speech in a voice message in the form of a natural language. In another example, the speaker 150 may be configured to output, based on identifying that the private information is included in the first image through the neural network model, a notification sound that the private information is included in the first image, or output a voice message that the private information is included in the first image.

The configuration for outputting audio may be realized with the speaker, but this is merely one embodiment, and may be realized as an output terminal capable of outputting audio data.

The microphone 160 may be configured to receive the user voice. The microphone 160 may be configured to receive a trigger voice (or, wakeup voice) showing the start of speech recognition through the dialogue system, and may receive a user inquiry requesting specific information. For example, the microphone 160 may be configured to receive the user voice in which the command to transmit the first image to the external device is included. In another example, the microphone 160 may be configured to process the private information included in the first image, and receive the user voice in which the command to transmit the processed image to the external device is included. The voice received from the microphone 160 may be input to the dialogue system by the processor 140.

The microphone 160 may be provided internally in the electronic device 100, but may be provided externally and electrically connected with the electronic device 100. In still another example, the microphone 160 may be provided externally and communicatively connected with the electronic device 100.

The inputter 170 may be configured to receive the user input for controlling the electronic device 100. Specifically, the inputter 170 may include a touch panel for receiving a touch of the user using a hand of the user, a stylus pen, or the like, a button for receiving a user operation, and the like. In addition thereto, the inputter 170 may be realized as a different input device (e.g., a keyboard, a mouse, a motion inputter, etc.).

For example, the inputter 170 may be configured to receive the user touch of selecting an area which is selected for processing (e.g., blurring process, masking process, etc.) from among the private information included in the first image. In another example, the inputter 170 may be configured to receive, through the third UI, the user touch of selecting an area in which the private information, which is not identified by the neural network model, included in the first image.

The camera 180 may be a configuration capable of obtaining at least one image by capturing the surroundings of the electronic device 100. For example, the camera 180 may be configured to obtain a moving image comprised of a plurality of image frames which captured the surroundings of the electronic device 100. In another example, the camera 180 may be configured to obtain a still image by capturing the surroundings of the electronic device 100.

Based on the camera 180 obtaining the second image by capturing the surroundings of the electronic device 100, the processor 140 may be configured to identify whether the private information is included in the second image by inputting the second image in the neural network model. At this time, the second image may be a still image, but may be realized as a moving image.

The second image may be realized in a live-view. Based on identifying that the private information is included in the live-view while the display 120 is controlled to display the live-view, the processor 140 may be configured to display a bounding box which shows a form of a private information in the area with the private information included in the live-view. Further, the processor 140 may be configured to control the speaker 150 to output a notification sound that the private information is included in the live-view, or control the display 120 to display a message that the private information is included in the live-view.

The sensor 190 may be configured to detect various status information of the electronic device 100. For example, the sensor 190 may include a movement sensor (e.g., gyro sensor, acceleration sensor, etc.) capable of detecting movement information of the electronic device 100, and a sensor capable of detecting location information (e.g., global positioning system (GPS) sensor). In another example, the sensor 190 may include an image sensor or the like for capturing the outside of the electronic device 100.

The technology described in the disclosure is not for limiting the scope of the disclosure to a specific embodiment, but should be interpreted to include all modifications, equivalents and/or alternatives of the embodiments. In describing the embodiments, like reference numerals may be used to refer to like elements.

In the disclosure, expressions such as "comprise," "may comprise," "include," "may include," or the like are used to designate a presence of a corresponding characteristic (e.g., elements such as numerical value, function, operation, or component, etc.), and not to preclude a presence or a possibility of additional characteristics.

In the disclosure, expressions such as "A or B," "at least one of A and/or B," or "one or more of A and/or B" may include all possible combinations of the items listed together. For example, "A or B," "at least one of A and B," or "at least one of A or B" may refer to all cases including (1) at least one A, (2) at least one B, or (3) both of at least one A and at least one B.

Expressions such as "first," "second," "1st," "2nd," or so on used herein may be used to refer to various elements regardless of order and/or importance, and it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element). On the other hand, when a certain element (e.g., first element) is indicated as "directly coupled with/to" or "directly connected to" another element (e.g., second element), it may be understood as the other element (e.g., third element) not being present between the certain element and the another element.

The expression "configured to . . . (or set up to)" used in the disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware. Rather, in a certain circumstance, the expression "a device configured to . . . " may mean something that the device "may perform . . . " together with another device or components. For example, the phrase "a sub-processor configured to (or set up to) perform A, B, or C" may mean a dedicated processor for performing a corresponding operation (e.g., embedded processor), or a generic-purpose processor (e.g., a central processing unit (CPU) or an application processor) capable of performing the corresponding operations by executing one or more software programs stored in a memory device.

The terms "part" or "module" used in the disclosure may include a unit configured as a hardware, software, or firmware, and may be used interchangeably with terms such as, for example, and without limitation, logic, logic blocks, components, circuits, or the like. "Part" or "module" may be a component integrally formed or a minimum unit or a part of the component performing one or more functions. For example, a module may be configured as an application-specific integrated circuit (ASIC).

The various embodiments of the disclosure may be implemented with software including instructions stored in a machine-readable storage media (e.g., computer). The machine may call an instruction stored in the storage medium, and as a device capable of operating according to the called instruction, may include an electronic device (e.g., the electronic device 100) according to the above-mentioned embodiments. Based on the instruction being executed by the processor, the processor may directly or using other elements under the control of the processor perform a function corresponding to the instruction. The instructions may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored and data temporarily being stored in the storage medium.

According to an embodiment, a method according to the various embodiments may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be at least stored temporarily in a storage medium such as a server of a manufacturer, a server of an application store, or a memory of a relay server, or temporarily generated.

Respective elements (e.g., a module or a program) according to various embodiments may be comprised of a single entity or a plurality of entities, and some sub-elements of the abovementioned sub-elements may be omitted, or different sub-elements may be further included in the various embodiments. Alternatively or additionally, some elements (e.g., modules or programs) may be integrated into one entity to perform the same or similar functions performed by the respective corresponding elements prior to integration. Operations performed by a module, a program, or another element, in accordance with various embodiments, may be performed sequentially, in a parallel, repetitively, or in a heuristically manner, or at least some operations may be performed in a different order, omitted or a different operation may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a memory comprising a neural network model trained to identify private information of a user of the electronic device comprised in an image;
a display;
a communicator comprising circuitry; and
a processor configured to:
based on a user command to transmit a first image to an external device being input, identify whether the private information of the user is comprised in the first image by inputting the first image in the neural network model,
based on identifying that the private information of the user is comprised in the first image, control the display to display a first user interface (UI) asking whether to process at least one piece of the private information based on the private information comprised in the first image, and
based on a user command input through the first UI, process the first image and control the communicator to transmit the processed first image to the external device,
wherein the neural network model comprises:
an object detection model trained to detect one or more objects comprised in the first image and classify a detected object as at least one of text or an image;
a text classification model trained to output a first privacy level corresponding to an object classified as the text from among detected objects; and
an image classification model trained to output a second privacy level corresponding to an object classified as the image from among the detected objects,
wherein the processor is further configured to:
based on the first privacy level exceeding a first threshold value or the second privacy level exceeding a second threshold value which is different from the first threshold value, identify that the private information of the user is comprised in the first image, and
obtain meta data on the private information comprised in the first image through the neural network model, and
wherein the text classification model comprises a text type classification model which is trained to output the first privacy level corresponding to a text type based on the text type obtained through a rule-based classification model and final feature data obtained through a feature data processing model.

2. The electronic device of claim 1, wherein the text classification model is characterized by:
identifying a type corresponding to the object classified as the text; and
applying a pre-defined weight to the identified type to output data to calculate the first privacy level.

3. The electronic device of claim 1, wherein the processor is further configured to:
use information on a location of the private information comprised in the first image from among the meta data, and
control the display to display the first UI in which a bounding box, which shows an area in which the private information is located from among the first image, is comprised.

4. The electronic device of claim 1, wherein the processor is further configured to:
based on a user command of not processing the private information comprised in the first image being input through the first UI, control the communicator to transmit the first image to the external device, and
based on a user command of processing the private information comprised in the first image being input through the first UI, perform a blurring process or a masking process of an area in which the private information is comprised in the first image and control the communicator to transmit the processed first image to the external device.

5. The electronic device of claim 1, wherein the processor is further configured to, based on identifying that the private information of the user is not comprised in the first image, control the communicator to transmit the first image to the external device.

6. The electronic device of claim 1, further comprising:
a camera;
wherein the processor is further configured to:
based on a second image being obtained by capturing surroundings of the electronic device through the camera, identify whether the private information of the user in comprised in the second image by inputting the second image in the neural network model, and
based on the private information of the user being comprised in the second image, control the display to display a second UI requesting a user authentication in response to a user command selecting the second image being input.

7. The electronic device of claim 1, wherein the processor is further configured to, based on the external device being a social networking service (SNS) server managing an SNS, upload an image in which an area comprising the private information of the user is processed from among the first image based on meta data in an SNS account of the user by controlling the communicator to transmit the first image and meta data on the private information comprised in the first image.

8. The electronic device of claim 1, wherein the processor is further configured to:
based on identifying whether the private information of the user is comprised in the first image through the neural network model, control the display to display a third UI asking whether the private information not identified by the neural network model is comprised in the first image, and
additionally train the neural network model based on information input from the user through the third UI.

9. The electronic device of claim 1, wherein the text type classification model is trained to obtain a calculation value by applying pre-defined weights matched for respective types of text for respective types of text and output the first privacy level output by using the obtained calculation value and the final feature data.

10. A method of controlling an electronic device comprising a neural network model trained to identify private information of a user of the electronic device comprised in an image, the method comprising:
- based on a user command to transmit a first image to an external device being input, identifying whether the private information of the user is comprised in the first image by inputting the first image in the neural network model;
- based on identifying that the private information of the user is comprised in the first image, displaying a first user interface (UI) asking whether to process at least one piece of the private information based on the private information comprised in the first image; and
- based on a user command input through the first UI, processing the first image and transmitting the processed first image to the external devices,
- wherein the neural network model comprises:
  - an object detection model trained to detect one or more objects comprised in the first image and classify a detected object as at least one of text or an image;
  - a text classification model trained to output a first privacy level corresponding to an object classified as the text from among detected objects; and
  - an image classification model trained to output a second privacy level corresponding to an object classified as the image from among the detected objects,
- wherein the identifying comprises:
  - based on the first privacy level exceeding a first threshold value or the second privacy level exceeding a second threshold value which is different from the first threshold value, identifying that the private information of the user is comprised in the first image; and
  - obtaining meta data on the private information comprised in the first image through the neural network model, and
- wherein the text classification model comprises a text type classification model which is trained to output the first privacy level corresponding to a text type based on the text type obtained through a rule-based classification model and final feature data obtained through a feature data processing model.

11. The method of claim 10, wherein the text classification model is characterized by:
- identifying a type corresponding to the object classified as the text; and
- applying a pre-defined weight to the identified type to output data to calculate the first privacy level.

12. The method of claim 10, wherein the displaying of the first UI comprises:
- using information on a location of the private information comprised in the first image from among the meta data; and
- displaying the first UI in which a bounding box, which shows an area in which the private information is located from among the first image, is comprised.

* * * * *